May 21, 1929.　　　　F. J. PLYM　　　　1,714,188
WINDOW JOINT AND METHOD OF MAKING THE SAME
Filed Feb. 11, 1927　　4 Sheets-Sheet 1
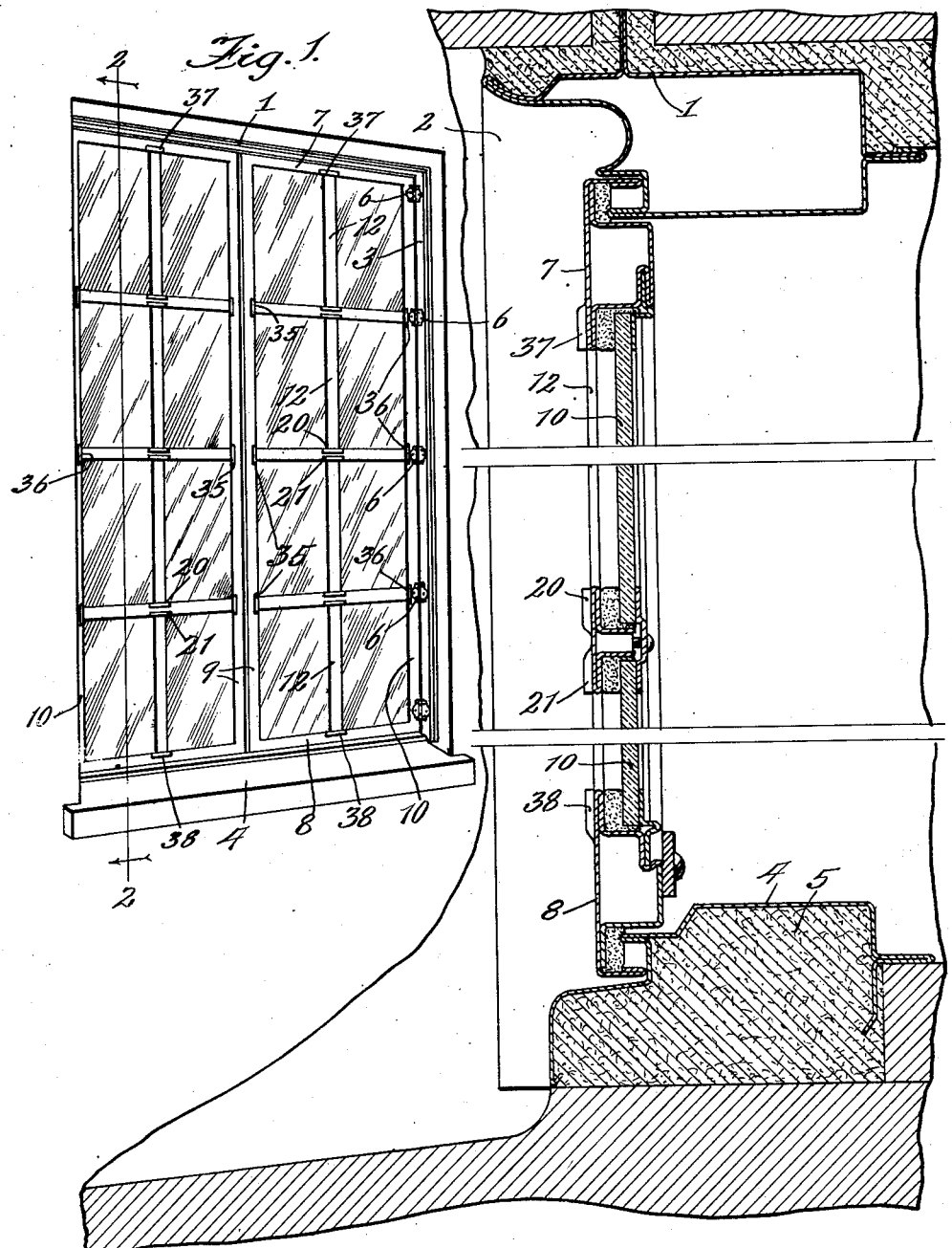
Inventor:
FRANCIS J. PLYM,
By Wallace R. Lane.
Atty.

May 21, 1929.  F. J. PLYM  1,714,188
WINDOW JOINT AND METHOD OF MAKING THE SAME
Filed Feb. 11, 1927   4 Sheets-Sheet 2
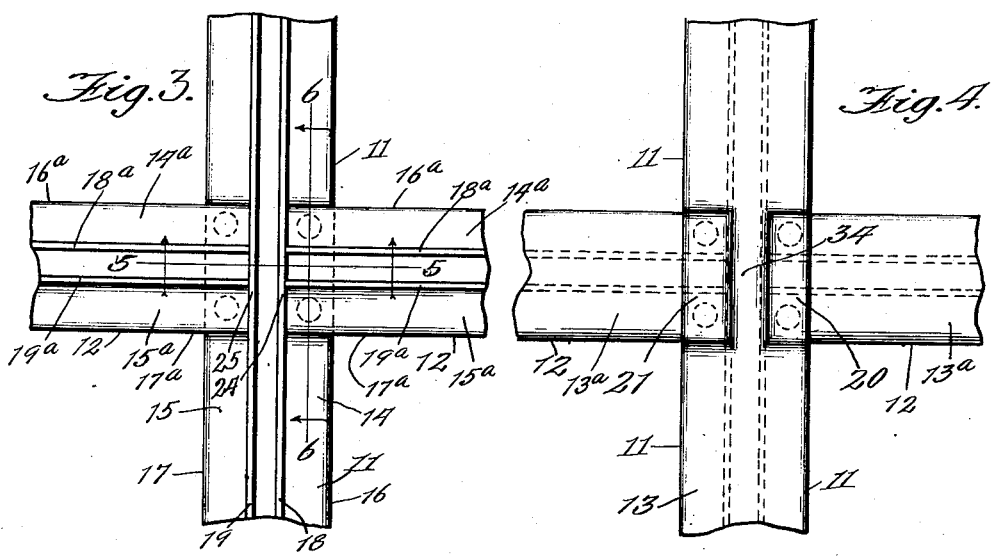
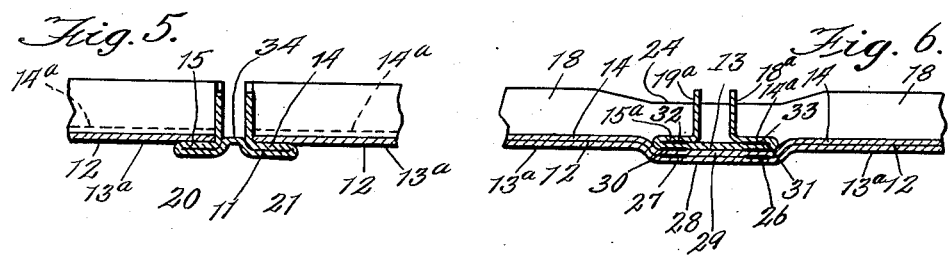
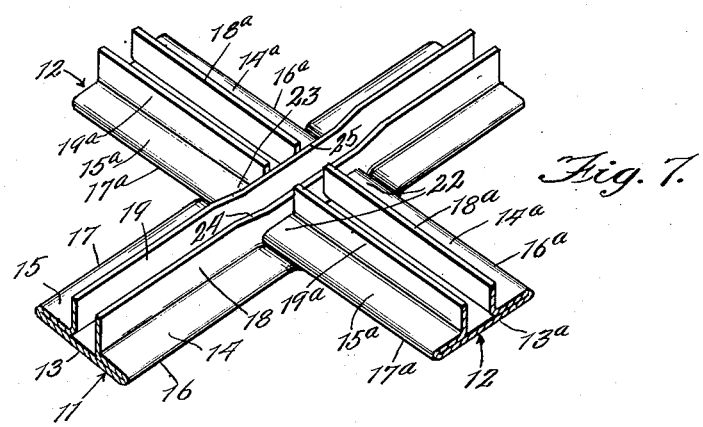
Inventor:
FRANCIS J. PLYM,
By Wallace R. Lane
Atty.

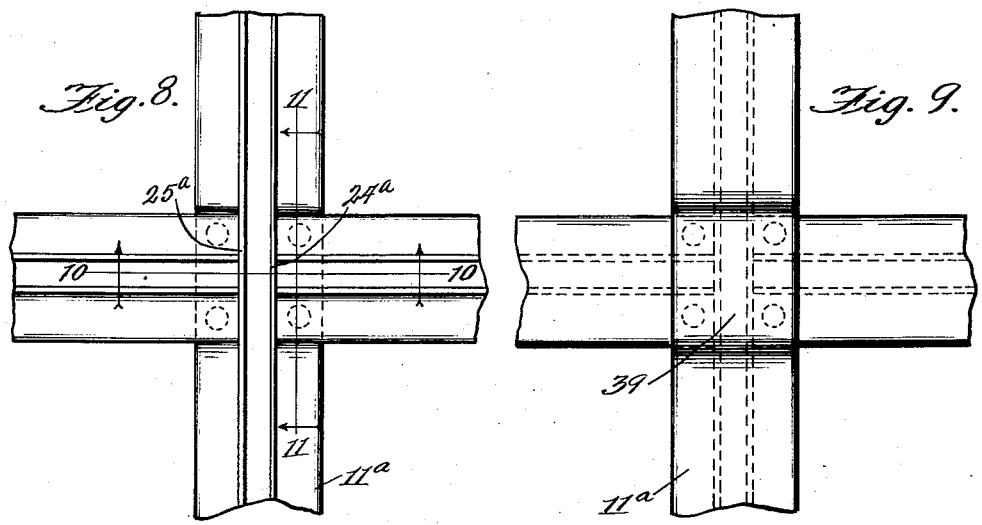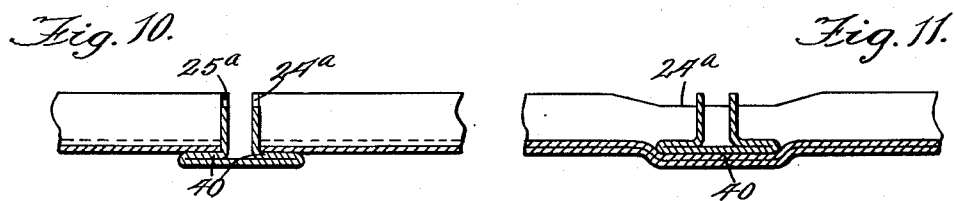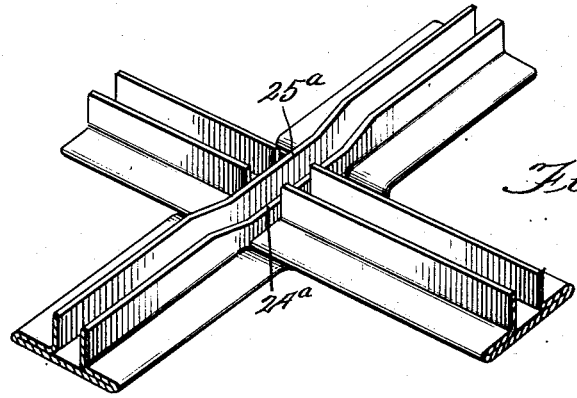

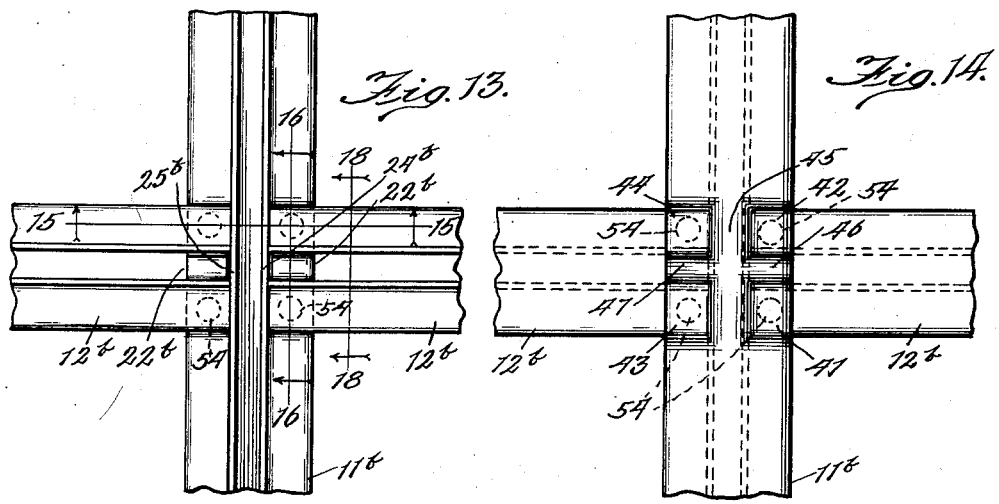
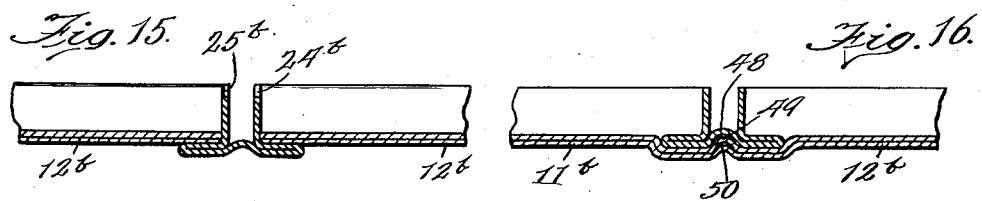
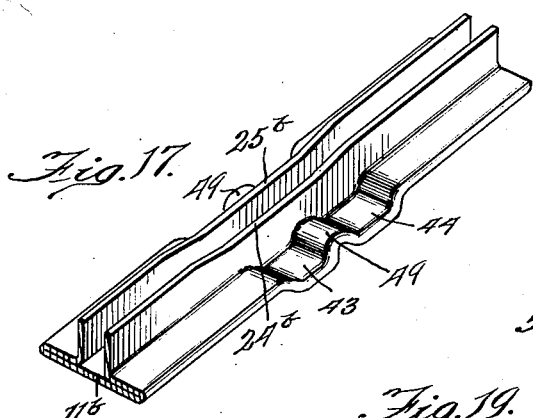
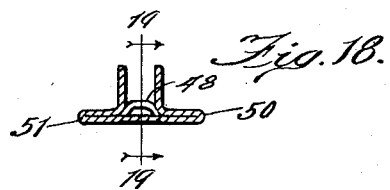
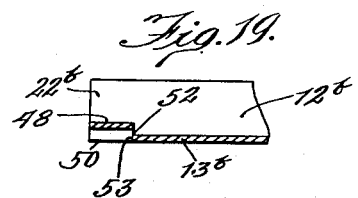

Patented May 21, 1929.

1,714,188

UNITED STATES PATENT OFFICE.

FRANCIS JOHN PLYM, OF NILES, MICHIGAN, ASSIGNOR TO THE KAWNEER COMPANY, OF NILES, MICHIGAN, A CORPORATION OF MICHIGAN.

WINDOW JOINT AND METHOD OF MAKING THE SAME.

Application filed February 11, 1927. Serial No. 167,386.

The present invention relates to window constructions, and more particularly to means for joining or connecting parts thereof.

Among the objects of the invention is to provide a novel window joint or the like whereby one of the frame members, or one of the crossing members, such as a muntin, may have a depression or off-set portion so formed and shaped to receive and have secured thereto, an end of a member or muntin transverse thereto, the securement being preferably effected by welding as with weld spots spaced from each other to give the greatest rigidity and solidity possible. The depressions are preferably formed in the edge or lateral flange portions without causing a separation of the flange and face portions from the rib portions at the rear of the face portion, the rib portion being preferably depressed with the depressed flange portion, so that the integrality of the structure will be maintained. In this way the formation of the depression, or seats, are formed without the weakening of the member, as would be the case where a face portion is torn or otherwise separated from the rib for the insertion of a flange or a whole part of an adjoining and transverse member. Moreover, by welding the connected parts, permanent rigidity is effected which would be impossible were the parts secured with rivets or the like, since the latter would in time become loosened and destroy all rigidity and solidity of the structure as well as producing a window which would rattle and offer open joints for the entry of water or the like and hence be corrodible, the invention thus avoiding the same unaffected by the elements and the weakening by time. Also welding has the advantage over other means of connection, such as riveting, in that the overlapping parts will be maintained in perfect relation or alinement. Welding will also make it facile for effecting proper and correct equidistancing of the crossing bars or muntins, as well as positively maintaining the alinement indefinitely after the welding is effected. In this way the vertical muntins or bars will remain plumb and the horizontal muntins or bars in fixed relations thereto and always horizontal, thus avoiding any perceptible variation or irregularity of the joined parts, as heretofore.

Another object of the invention is to provide a muntin and a joint for muntins of sheet material, such as sheet metal which may be in the form of a strip or bar and rolled to a form to present a face piece or portion, a back piece or pieces or portions, preferably joined or connected at the adjoining and outer edges thereof, as by the bending back of the back portion into parallelism or in contact with the rear surface of the face portion, and a rear rib composed of one or more bent back portions from the back portion so as to extend rearwardly from the face piece or portion, such as at a normal thereto. These back pieces or portions may be and are preferably spaced so that an anchor-block or plug may be held between a pair of rib portions for the engagement therewith of securing means, such as a screw for the holding of a cover strip or strips on the opposite sides or faces of the glass or panes for holding the same in place, the plugs being preferably located at the intersecting points of the muntins.

The invention also comprehends the making of these muntins with depressions or pressed out portions or off-set portions at or proximate to the points of joining of the crossing muntins. These depressions are preferably made in the side portions of the face and back pieces, with or without the central or medial parts thereof depressed. These depressions are made to the extent, not only to permit the fitting therein of the end or ends of the adjoining muntins, but also to bring the outer surface of the face portions thereof into the plane of the outer surface of the face portion of the muntin to which the adjoining muntins are secured. This presents a substantially flat and smooth outer face for the whole frame, with the depressions, which are small and extending but slightly from such face, so that the general appearance of the frame is that of beauty and regularity, the exposed metal surfaces of the muntins being preferably polished or plated and polished as desired. The frame will have a more craftsmanship appearance as well as beauty without detracting from the utility thereof.

The invention also comprehends a novel process of producing the structure above mentioned with greater economy than heretofore and with the elimination of a large amount of hand work previously required, thus offering for producing on a large scale of a finished article of pleasing appearance and which will be durable. By bending the back portions about the lateral edges of the face portions, the edges of the muntins are given a rounded bead effect which is smooth and devoid of projections which might, in other cases, necessitate removal by beveling or the like. In this way rough edges and corners are avoided with the result of producing an article with simple and few operations.

Other objects, capabilities, advantages, feature and process steps are comprehended by the invention as will later appear and are inherently possessed thereby.

Referring now to the drawings, Fig. 1 is a view of a window constructed in accordance with the invention.

Fig. 2 is a fragmentary transverse vertical sectional view taken in a plane represented by line 2—2 in Fig. 1 of the drawings.

Fig. 3 is a view in vertical elevation of a joint constructed in accordance with the invention, with the muntins broken.

Fig. 4 is a similar view of the opposite side thereof.

Fig. 5 is a fragmentary and sectional view taken in a plane represented by line 5—5 in Fig. 3 of the drawings.

Fig. 6 is a similar view taken in a plane represented by line 6—6 in Fig. 3 of the drawings.

Fig. 7 is a perspective view of this form of joint.

Fig. 8 is a view in elevation of an alternate form of joint.

Fig. 9 is a similar view of the opposite side thereof.

Fig. 10 is a fragmentary and sectional view taken in a plane represented by line 10—10 of Fig. 8 of the drawings.

Fig. 11 is a similar view taken in a plane represented by line 11—11 in Fig. 8 of the drawings.

Fig. 12 is a perspective view of the same.

Fig. 13 is a view in elevation of another alternate form of joint.

Fig. 14 is a similar view of the opposite side thereof.

Fig. 15 is a fragmentary and sectional view taken in a plane represented by line 15—15 in Fig. 13 of the drawings.

Fig. 16 is a similar view taken in a plane represented by line 16—16 in Fig. 13 of the drawings.

Fig. 17 is a fragmentary and perspective view of one of the elements of this joint.

Fig. 18 is a transverse sectional view taken in a plane represented by line 18—18 in Fig. 13 of the drawings, and;

Fig. 19 is a longitudinal sectional view taken in a plane represented by line 19—19 in Fig. 18 of the drawings.

Referring now more in details to the drawings, the invention is shown embodied in a window having a head piece or lintel 1 which may be of any desirable form, and as shown as of hollow sheet metal and of the shape shown in Fig. 2 of the drawings. Integrally therewith there may be formed side members or jambs 2 and 3 and a sill member at the bottom 4, the latter being, if desired, filled with hardened plastic material 5. The frames of the window may be of the desired type and in the illustration shown are of the French type and are hinged by hinges 6 to the jambs of the window. These frames may comprise upper and lower longitudinal members 7 and 8 and vertical or upright members 9 and 10. These frame members may be integrally connected and may be of any suitable form, such as hollow sheet metal and of the shape or form shown in Fig. 2 of the drawings.

Within the frame members mentioned, may be located a number of longitudinal muntins or bars 11 and vertical or transverse muntins or bars 12. These may be joined together and also joined to the frame members 7, 8, 9 and 10 by any one of the alternate forms of joint or joining means disclosed in the remainder of these drawings, and the form shown in Figs. 3 to 7 inclusive is the form used in Fig. 1 by way of illustration.

Referring now more in detail to Figs. 3 to 7 inclusive, of the drawings, the muntins 11 and 12 are similarly formed from sheet metal strips which may be rolled to provide an outer or faced piece or portion 13 and 13$^a$, and bent back pieces or portions 14, 14$^a$, 15 and 15$^a$, these bent back portions forming with the outer edges of the face portion 13 and 13$^a$ smooth side edges or beads 16, 16$^a$, 17 and 17$^a$ as clearly shown in Fig. 7 of the drawings. The bent back portions 14, 14$^a$, 15 and 15$^a$ are then bent rearwardly to form rib portions 18, 18$^a$, 19 and 19$^a$ which may extend rearwardly from the rear face of the face portions 13 and 13$^a$, and are also preferably spaced to form channels therebetween for a purpose later explained. The bent back portions 14, 14$^a$, 15 and 15$^a$ preferably are disposed parallel to and in contact with the rear face of the face portions 13 and 13$^a$. This description applies to all of the forms of joints shown upon the drawings, including also those referred to in Figs. 8 to 12 inclusive and 13 to 19 inclusive.

Referring now more in particular to the muntin 11 in the form shown in Figs. 3 to 7 inclusive, the face portion 13 and back portions 14 and 15 at the points where the joining of the transverse muntins 12 are to be connected, are depressed so as to form off-set or depressed portions 20 and 21 in which may then be located the ends 22 and 23 of adjoining muntins 12 so that the outer face or surface of the face portion 13$^a$ of muntin 12 may be disposed in a plane coincident with the plane of the outer surface of the face portion 13 of the muntin 11. In order that the back portions 14 and 15 may not be separated from the ribs 18 and 19, the latter are caused to be depressed with that part of the back portions 14 and 15 which are depressed, thus forming the depressed portions 24 and 25 of the ribs 18 and 19, and causing these portions to remain integral with the adjacent or adjoining depressed portions of the back pieces 14 and 15.

These rib portions 24 and 25 also serve as abutment means or gauge walls for contact therewith of the ends 22 and 23 and also the ends of the ribs thereof or of the muntins 12 when the latter are inverted or placed in the depressions for securement therein. This offers an exact means for the positioning and equi-distancing of the muntins 11 by the proper engagement of the ends of the transverse muntins 12 therewith. It will be noted that the ends of the depressions are curved so as to substantially fit with the rounded portions of the beads $16^a$ or $17^a$ or both of the muntins 12. When so properly positioned, the muntins 12 may then be secured to the depressed portions by spot welding or the like effecting welded spots 26 and 27 in the depressed portions between the depressed face portion 28 and the depressed back portion 29, and also weld spots 30 and 31 between the depressed back portion 29 and the face portion $13^a$ of the transverse muntin 12, and likewise weld spots between the face portion $13^a$ and the back portions $14^a$ and $15^a$ of the transverse muntin 12. It will also be noted that these spots are as widely separated as possible whereby there will be a rigid and solid connection between the parts so as to prevent any chance of bending or loosening of the muntin 12 from the muntin 11.

The depressed portions 20 and 21 are so made as to provide or leave an undepressed portion 34 therebetween so that the outer surface thereof will be in coincidence with the plane of the outer surface 13 of the muntin 11. This provides for a simple and yet beautiful appearance of the joint without in any way detracting from the utility thereof.

The side frame members 9 and 10 may be similarly formed with depressed flange portions 35 and 36 corresponding to the depressed portions 20 and 21 of the connected muntins. The outer ends of the muntins 11 are connected into these depressed portions 35 and 36 in exactly the same way as in the depressions 20 and 21 of the muntin 11. Likewise members 7 and 8 of the frame are provided with similar depressions 37 and 38 for the reception therein and connection therewith of the upper and lower ends of the upper and lower muntins 12, the connection being exactly the same as the connection between the muntins 12 and the depressions 20 to 21 of the form of joint or joining means shown in Figs. 3 to 7 inclusive.

Referring now to Figs. 8 to 12 inclusive, the muntins are made exactly the same as in those shown in Figs. 3 to 7 inclusive, except for the form of the depression in the muntin $11^a$, the depression made in this alternate form extending for the full width of the muntin. In other words, the muntin $11^a$ has a depressed portion 39 for the full width thereof, and the rib portions $24^a$ and $25^a$ are also depressed to be maintained integral with the adjoining depressed back portion 40 of the muntin. In other respects the parts are connected exactly as in the form shown in Figs. 3 to 7 inclusive.

In the form shown in Figs. 13 to 19 inclusive, the muntins are also of the same general structure as in the other forms described, with the exception that the depressions or the joints comprise two spaced depressions 41 and 42 in one of the side flanges or back pieces and adjacent portion of the face pieces, and two other depressions 43 and 44 also spaced from each other and formed in the other side flange or back piece and adjoining portion of front piece of the muntin. This provides for a central undepressed portion 45 between the group of depressions 41 and 42 and the group of depressions 43 and 44, and likewise undepressed portions 46 and 47, of which the form is between the depressions 41 and 42 and the latter between the depressions 43 and 44. The connected transverse muntins $12^b$ have their ends $22^b$ so shaped or formed to fit into these depressions, such as the depressions 41 and 42 or depressions 43 and 44. In order to provide for the same to properly fit into these depressions, the end $22^b$ of a cross-muntin $12^b$ is preferably shaped to provide an intermediate raised portion 48 adapted to rest over the undepressed portion 49, and at each side of the portion 48 with portions 49 and 50 which are made up of face pieces and back pieces of the end of the muntin, and adapted to seat in and fit within the depressions 43 and 44. This is also true of the muntin on the opposite side of the muntin $11^b$ and adapted to fit into the depressions 41 and 42 in like fashion. When the part 48 is formed it is struck up from the face portion $13^b$ whereby a cut or slot 52 may be formed so that the end 53 of the face portion $13^b$ may abut against the end of the portion 47 of the undepressed part of the muntin $11^b$, thus acting as a gauge in connection with the rib portions $24^b$ and $25^b$. After the ends of the cross muntins are seated in the depressions, they may be welded to form weld spots 54 as clearly shown in the drawings.

While I have herein described and upon the drawings shown a few illustrative embodiments of the invention, it is to be understood that the latter is not limited thereto but may comprehend other constructions, details, arrangements of parts, features, and other process steps without departing from the spirit thereof.

Having thus disclosed the invention, I claim:

1. In a metal window structure, comprising longitudinal and transverse muntins, said longitudinal muntins having flanges formed of a face and a portion bent upon the rear of the face and provided with depressed portions, the ends of said transverse muntins fitting into said depressed portions, and means for rigidly securing said ends to said depressed portions.

2. In a metal window structure, comprising longitudinal and transverse muntins, said longitudinal muntins having flanges formed of a face and a portion bent upon the rear of the face and provided with depressed portions, the ends of said transverse muntins fitting into said depressed portions, and spaced weld spots for rigidly securing said ends to said depressed portions.

3. In a metal window construction, a muntin made of sheet metal shaped to form a smooth face portion, portions bent back upon the rear side of the face portions to form smooth edge portions, and portions bent substantially at a normal to the face portion and contacting therewith to form a rib at the rear of the face portion.

4. In a metal window construction, a muntin made of sheet metal shaped to form a smooth face portion, portions bent back upon the rear side of the face portions to form smooth edge portions, and portions bent substantially at a normal to the face portion to form a rib at the rear of the face portion, said face and bent back portions being formed with a depressed portion at a given point for providing a seat for engagement of an end of another muntin.

5. A muntin for windows, comprising a face piece, back pieces parallel to the face piece and connected to the face piece at the lateral edges thereof, and rib elements connected to the inner edges of the back pieces and extending rearwardly from the face piece, said back pieces and adjacent portions of said face piece being depressed at a given point for forming a seat for the engagement of an end of another muntin.

6. A muntin for windows, comprising a face piece, back pieces parallel to the face piece and connected to the face piece at the lateral edges thereof, said pieces lying in contacting relation, and rib elements connected to the inner edges of the back pieces and extending rearwardly from the face piece.

In witness whereof, I hereunto subscribe my name to this specification.

F. J. PLYM.